US012158857B2

(12) United States Patent
Shimizu

(10) Patent No.: US 12,158,857 B2
(45) Date of Patent: Dec. 3, 2024

(54) INFORMATION PROCESSING APPARATUS, INFORMATION PROCESSING SYSTEM, CONNECTION CONTROL METHOD, AND NON-TRANSITORY COMPUTER READABLE MEDIUM STORING CONNECTION CONTROL PROGRAM

(71) Applicant: NEC Corporation, Tokyo (JP)

(72) Inventor: Yoshio Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 18/022,387

(22) PCT Filed: Jul. 16, 2021

(86) PCT No.: PCT/JP2021/026735
§ 371 (c)(1),
(2) Date: Feb. 21, 2023

(87) PCT Pub. No.: WO2022/070557
PCT Pub. Date: Apr. 7, 2022

(65) Prior Publication Data
US 2024/0037056 A1    Feb. 1, 2024

(30) Foreign Application Priority Data
Sep. 29, 2020   (JP) .................... 2020-163071

(51) Int. Cl.
*G06F 13/42* (2006.01)
*G06F 13/40* (2006.01)
(52) U.S. Cl.
CPC ...... *G06F 13/4221* (2013.01); *G06F 13/4027* (2013.01); *G06F 2213/0026* (2013.01)

(58) Field of Classification Search
None
See application file for complete search history.

(56) References Cited

U.S. PATENT DOCUMENTS

| 9,280,508 | B1 | 3/2016 | Tabor et al. |
| 11,068,421 | B1 * | 7/2021 | Tsai ................ G06F 3/0635 |
| 11,086,813 | B1 * | 8/2021 | Schuette ......... G06F 13/4022 |

FOREIGN PATENT DOCUMENTS

WO    2016/135875 A1    9/2016

OTHER PUBLICATIONS

International Search Report for PCT Application No. PCT/JP2021/026735, mailed on Sep. 7, 2021.
David A. Daniel et al., "Virtualization of Local Computer Bus Architectures Over the Internet", Proceedings of IEEE Globecom, 2007, IEEE, Nov. 2007, pp. 1-6.

\* cited by examiner

*Primary Examiner* — Farley Abad
*Assistant Examiner* — Dayton Lewis-Taylor

(57) ABSTRACT

A host (100) includes a PCIe Root Complex (102), a PCIe Expander (116) configured to be connected to a general-purpose network N, and a PCIe switch (108) including PCIe ports and configured to switch a connection between the Root Complex (102) and the Expander (116), in which the Expander (116) enables PCIe ports (109, 113) connected to upstream ports of the Root Complex (102) and the Expander (116) and disables a PCIe port (110) connected to a downstream port of the Expander (116) when the host (100) functions as a master, and disables the upstream port (109) and the downstream port (113) and enables the upstream port (110) when the host 100 functions as a slave.

8 Claims, 12 Drawing Sheets

INFORMATION PROCESSING APPARATUS, INFORMATION PROCESSING SYSTEM, CONNECTION CONTROL METHOD, AND NON-TRANSITORY COMPUTER READABLE MEDIUM STORING CONNECTION CONTROL PROGRAM

This application is a National Stage Entry of PCT/JP2021/026735 filed on Jul. 16, 2021, which claims priority from Japanese Patent Application 2020-163071 filed on Sep. 29, 2020, the contents of all of which are incorporated herein by reference, in their entirety.

TECHNICAL FIELD

The present invention relates to an information processing apparatus, an information processing system, a connection control method, and a non-transitory computer readable medium storing a connection control program.

BACKGROUND ART

Peripheral component interconnect express (PCI Express (Registered Trademark)) (hereafter also referred to as PCIe (Registered Trademark)) is used for connections of various PCIe devices such as network interface cards (NICs) and USB controllers disposed inside computers. There is a technology called ExpEther (Express Ether) for connecting an interconnect using such PCIe to the outside of the housing of a computer, and Non-patent Literature 1 discloses an example thereof.

Each of FIGS. 11 and 12 shows an example of the technology for connecting an interconnect using PCIe to the outside of the housing of a computer. In the example shown in FIG. 11, a host 300 and an I/O extension device 400 are connected to each other through a general-purpose network N so that they can communicate with each other. The host 300 and the I/O extension device 400 are respectively equipped with PCIe Expanders (PCIe Expander Engines) 301 and 401 formed of FPGAs (Field-Programmable Gate Arrays). The PCIe Expander 301 of the host 300 implements a master function. The PCIe Expander 401 of the I/O extension device 400 implements a slave function. Further, the PCIe Expander 301 of the host 300 and the PCIe Expander 401 of the I/O extension device 400 communicate with each other through a general-purpose network N such as an Ethernet (Registered Trademark). For example, when the PCIe Expanders 301 and 401 transfer PCIe packets through the network N in conformity with the Ethernet communication standards, they encapsulate the PCIe packets into Ethernet frames used in the Ethernet communication standards. Further, in communication between the PCIe Expanders 301 and 401, the general-purpose network N behaves as if it is an internal bus of a PCIe Switch. In this way, when observed from a PCIe Root Complex 311 of the host 300, PCIe Devices 412 and 413 disposed inside the I/O extension device 400 are connected under the PCIe Switch logically formed by the PCIe Expander 301. That is, the PCIe Root Complex 311 of the host 300 can recognize and use the PCIe Devices 412 and 413 disposed inside the I/O extension device 400.

Note that the PCIe Expander 301 having the master function has a function as an Upstream port 302 of the PCIe switch. Note that the upstream port of the PCIe switch is a port for signals sent to the PCIe Root Complex 311 in a tree in which the PCIe devices 308 and 309 are connected. Further, the PCIe Expander 401 having the slave function has a function as a Downstream port 402 of the PCIe switch. Note that the downstream port of the PCIe switch is a port for signals sent to the Endpoint in a tree in which the PCIe devices 412 and 413 are connected. Therefore, an FPGA image loaded into an FPGA that forms the PCIe Expander 301 is different from an FPGA image loaded into an FPGA that forms the PCIe Expander 401.

CITATION LIST

Non Patent Literature

Non-patent Literature 1: David A. Daniel, et al., "VIRTUALIZATION OF LOCAL COMPUTER BUS ARCHITECTURES OVER THE INTERNET", Proceedings of IEEE GLOBECOM, 2007, U.S.A., IEEE, November 2007, p. 1884-1889

SUMMARY OF INVENTION

Technical Problem

In the example shown in FIG. 11, the dedicated I/O extension device 400 is required to connect the interconnect using PCIe to the PCIe devices located outside the housing of the computer (e.g., the PCIe devices 412 and 413 in the example shown in FIG. 11).

Therefore, although a plurality of I/O extension devices 400 can be connected to one host 300, it is impossible to enable a plurality of hosts 300 to share I/O extension devices 400. For example, in the example shown in FIG. 12, hosts 300A and 300B are connected to I/O extension devices 400A, 400B and 400C through the general-purpose network N. Further, a PCIe connection is formed between the host 300A and the I/O extension devices 400A and 400B, and a PCIe connection is formed between the host 300B and the I/O extension device 400C. In this case, the PCIe devices 412 and 413 of the I/O extension devices 400A and 400B cannot be accessed from the host 300B. Similarly, the PCIe devices 412 and 413 of the I/O extension device 400C cannot be accessed from the host 300A.

Further, a plurality of PCIe devices 308 and 309 connected inside the host 300A cannot be shared with the other host 300B.

An object of the present disclosure is to provide an information processing apparatus, an information processing system, a connection control method, and a non-transitory computer readable medium storing a connection control program capable of sharing, among a plurality of information processing apparatuses, PCIe devices disposed inside the respective information processing apparatuses.

Solution to Problem

An information processing apparatus according to a first aspect of the present invention is an information processing apparatus capable of being connected to another information processing apparatus through a general-purpose network, the information processing apparatus including: a plurality of PCIe devices; a PCIe root complex configured to serve as a root of a PCI bus tree formed by a bus to which the plurality of PCIe devices are connected; a PCIe expander configured to connect the information processing apparatus to the general-purpose network; and a PCIe switch configured to switch a connection between the PCIe root complex and the PCIe expander, in which at least one of the plurality of PCIe devices is connected to the PCIe root complex through the PCIe switch, the PCIe switch includes a first upstream port capable of being connected to the PCIe root complex, a second upstream port capable of being connected to a downstream port of the PCIe expander, and a downstream port capable of being connected to an upstream port of the PCIe expander, the PCIe expander enables the first upstream port and the downstream port and disables the second upstream port when the information processing apparatus functions as a master and the other information processing apparatus functions as a slave, and the PCIe expander disables the first upstream port and the downstream port and enables the second upstream port when the information processing apparatus functions as a slave and the other information processing apparatus functions as a master.

An information processing system according to a second aspect of the present invention is an information processing system including a plurality of information processing apparatuses connected to each other through a general-purpose network, in which the information processing apparatus includes: a plurality of PCIe devices; a PCIe root complex configured to serve as a root of a PCI bus tree formed by a bus to which the plurality of PCIe devices are connected; a PCIe expander configured to connect the information processing apparatus to the general-purpose network; and a PCIe switch configured to switch a connection between the PCIe root complex and the PCIe expander, at least one of the plurality of PCIe devices is connected to the PCIe root complex through the PCIe switch, the PCIe switch includes a first upstream port capable of being connected to the PCIe root complex, a second upstream port capable of being connected to a downstream port of the PCIe expander, and a downstream port capable of being connected to an upstream port of the PCIe expander, the PCIe expander enables the first upstream port and the downstream port and disables the second upstream port when the information processing apparatus functions as a master and another information processing apparatus functions as a slave, and the PCIe expander disables the first upstream port and the downstream port and enables the second upstream port when the information processing apparatus functions as a slave and the other information processing apparatus functions as a master.

A connection control method according to a third aspect of the present invention is a connection control method performed in an information processing apparatus capable of being connected to another information processing apparatus through a general-purpose network, in which the information processing apparatus includes: a plurality of PCIe devices; a PCIe root complex configured to serve as a root of a PCI bus tree formed by a bus to which the plurality of PCIe devices are connected; a PCIe expander configured to connect the information processing apparatus to the general-purpose network; and a PCIe switch configured to switch a connection between the PCIe root complex and the PCIe expander, at least one of the plurality of PCIe devices is connected to the PCIe root complex through the PCIe switch, the PCIe switch includes a first upstream port capable of being connected to the PCIe root complex, a second upstream port capable of being connected to a downstream port of the PCIe expander, and a downstream port capable of being connected to an upstream port of the PCIe expander, the PCIe expander enables the first upstream port and the downstream port and disables the second upstream port when the information processing apparatus functions as a master and the other information processing apparatus functions as a slave, and the PCIe expander disables the first upstream port and the downstream port and enables the second upstream port when the information processing apparatus functions as a slave and the other information processing apparatus functions as a master.

A non-transitory computer readable medium storing a connection control program according to a fourth aspect of the present invention stores a connection control program adapted to be executed in an information processing apparatus capable of being connected to another information processing apparatus through a general-purpose network, in which the information processing apparatus includes: a plurality of PCIe devices; a PCIe root complex configured to serve as a root of a PCI bus tree formed by a bus to which the plurality of PCIe devices are connected; a PCIe expander configured to connect the information processing apparatus to the general-purpose network; and a PCIe switch configured to switch a connection between the PCIe root complex and the PCIe expander, at least one of the plurality of PCIe devices is connected to the PCIe root complex through the PCIe switch, the PCIe switch includes a first upstream port capable of being connected to the PCIe root complex, a second upstream port capable of being connected to a downstream port of the PCIe expander, and a downstream port capable of being connected to an upstream port of the PCIe expander, and the connection control program is adapted to cause the PCIe expander to perform: a process for enabling the first upstream port and the downstream port and disabling the second upstream port when the information processing apparatus functions as a master and the other information processing apparatus functions as a slave; and a process for disabling the first upstream port and the downstream port and enabling the second upstream port when the information processing apparatus functions as a slave and the other information processing apparatus functions as a master.

Advantageous Effects of Invention

It is possible to provide an information processing apparatus, an information processing system, a connection control method, and a non-transitory computer readable medium storing a connection control program capable of sharing, among a plurality of information processing apparatuses, PCIe devices disposed inside the respective information processing apparatuses.

EXAMPLE EMBODIMENT

An example embodiment according to the present invention will be described hereinafter with reference to the drawings.

Figure 1:
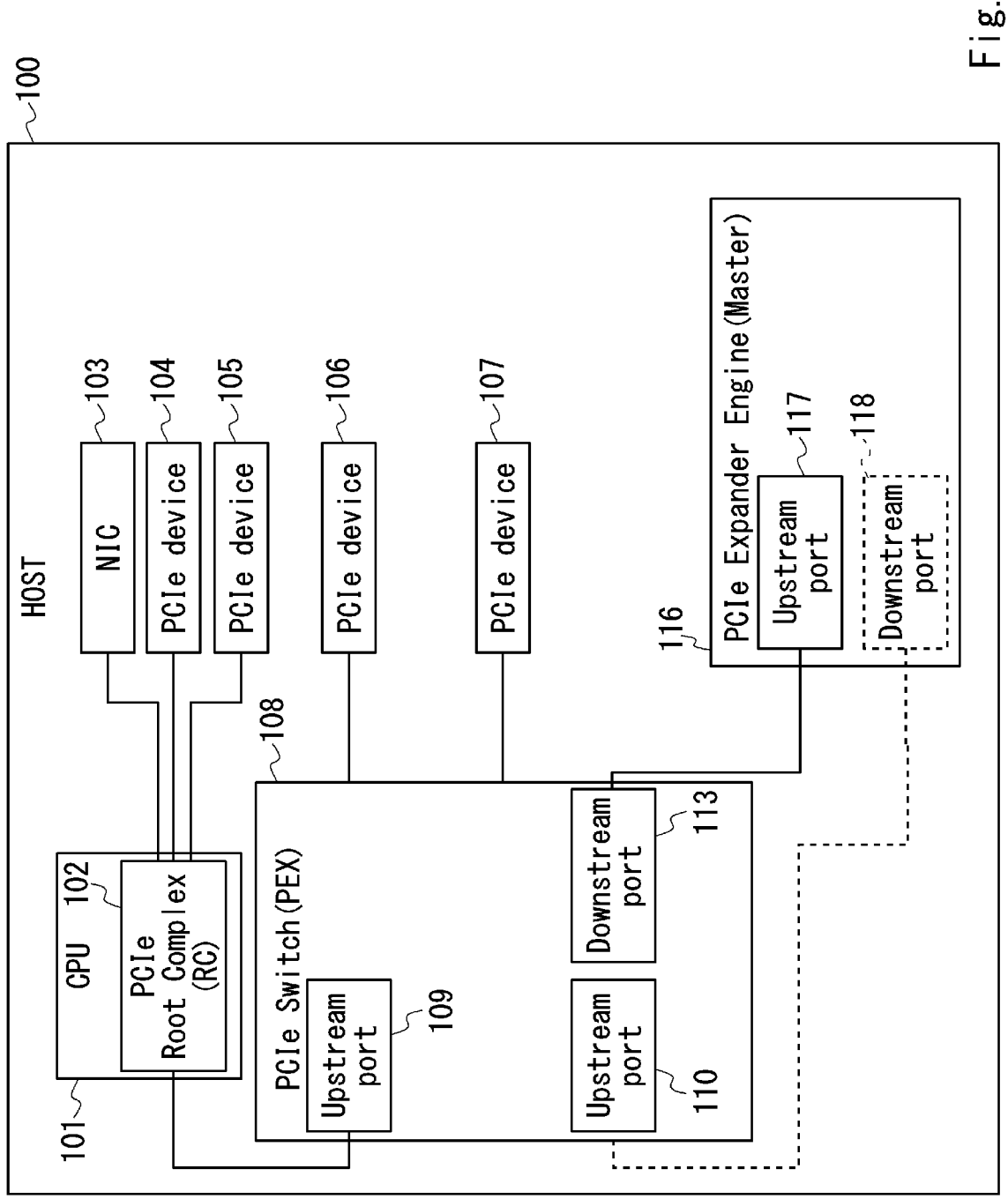
FIG. 1 is a block diagram showing an example of a host according to an example embodiment of the present invention.

FIG. 1 is a block diagram showing an example of a host 100 as an information processing apparatus according to an example embodiment of the present invention. The host 100 is connected to, for example, another host 100 through a general-purpose network N (not shown). As shown in FIG. 1, the host 100 includes a CPU (Central Processing Unit) 101, a PCIe Root Complex 102, and a PCIe Expander (PCIe Expander Engine) 116. Further, the host 100 includes, as a plurality of PCIe devices, a network interface card (hereafter also referred to as a "NIC") 103, PCIe Devices 104, 105, 106 and 107, and a PCIe Switch 108.

The PCIe Root Complex 102 is a device that serves as the root of a PCI bus tree formed by buses to which a plurality of PCIe devices are connected. Note that although the PCIe Root Complex 102 is incorporated into and formed inside the CPU 101 in FIG. 1, it may be formed outside the CPU 101.

A PCIe Switch 108 switches the connection between the PCIe Root Complex 102 and the PCIe Expander 116. Specifically, the PCIe Switch 108 includes an upstream port 109 as a first upstream port capable of being connected to the PCIe Root Complex 102, an upstream port 110 as a second upstream port capable of being connected to a downstream port 118 of the PCIe Expander 116, and a downstream port 113 capable of being connected to an upstream port 117 of the PCIe Expander 116.

Further, at least one of the plurality of PCIe devices, i.e., the PCIe devices 106 and 107 are connected to the PCIe Root Complex 102 through the PCIe Switch 108.

The PCIe Expander 116 connects the host 100 to the general-purpose network N. Further, the PCIe Expander 116 enables the upstream port 109 and the downstream port 113 and disables the upstream port 110 when the host 100 functions as a master and the other host 100 functions as a slave. Further, the PCIe Expander 116 disables the upstream port 109 and the downstream port 113 and enables the upstream port 110 when the host 100 functions as a slave and the other host 100 functions as a master.

According to the host 100 in accordance with the above-described example embodiment of the present invention, when the host 100 functions as a master and the other host 100 functions as a slave, the upstream port 109 and the downstream port 113 of the host 100 are enabled and the upstream port 110 thereof is disabled. Therefore, the PCIe Expander 116 is connected under the PCIe Switch 108 of the host 100. In this state, the upstream port 109 and the downstream port 113 are disabled and the upstream port 110 is enabled in the other host 100 functioning as the slave. Therefore, in this other host 100, the connection between the PCIe Root Complex 102 and the PCIe Switch 108 is disconnected, and the PCIe Switch 108 is connected under the PCIe Expander 116. As a result, the PCIe Root Complex 102 of the host 100 functioning as the master can access the PCIe devices 106 and 107 connected to the PCIe Switch 108 of the other host 100 functioning as the slave through the PCIe Expander 116 of the host 100 and the PCIe Expander 116 of the other host 100. Therefore, it is possible to provide a host 100 that can share, among a plurality of hosts 100, PCIe devices 106 and 107 disposed inside the respective hosts 100.

First Example Embodiment

Figure 2:
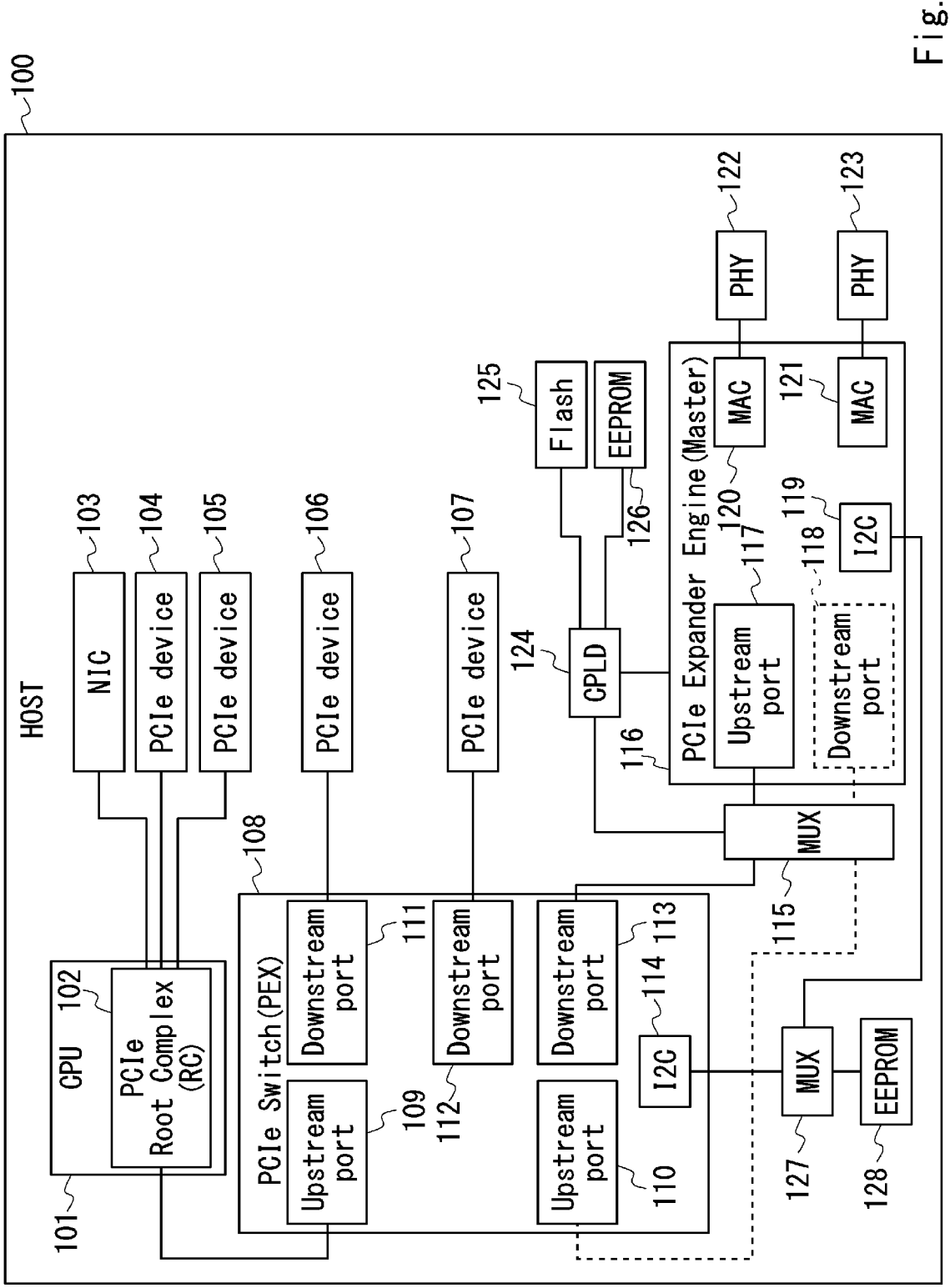
FIG. 2 is a block diagram showing an example of a host according to a first example embodiment of the present invention.
Figure 3:
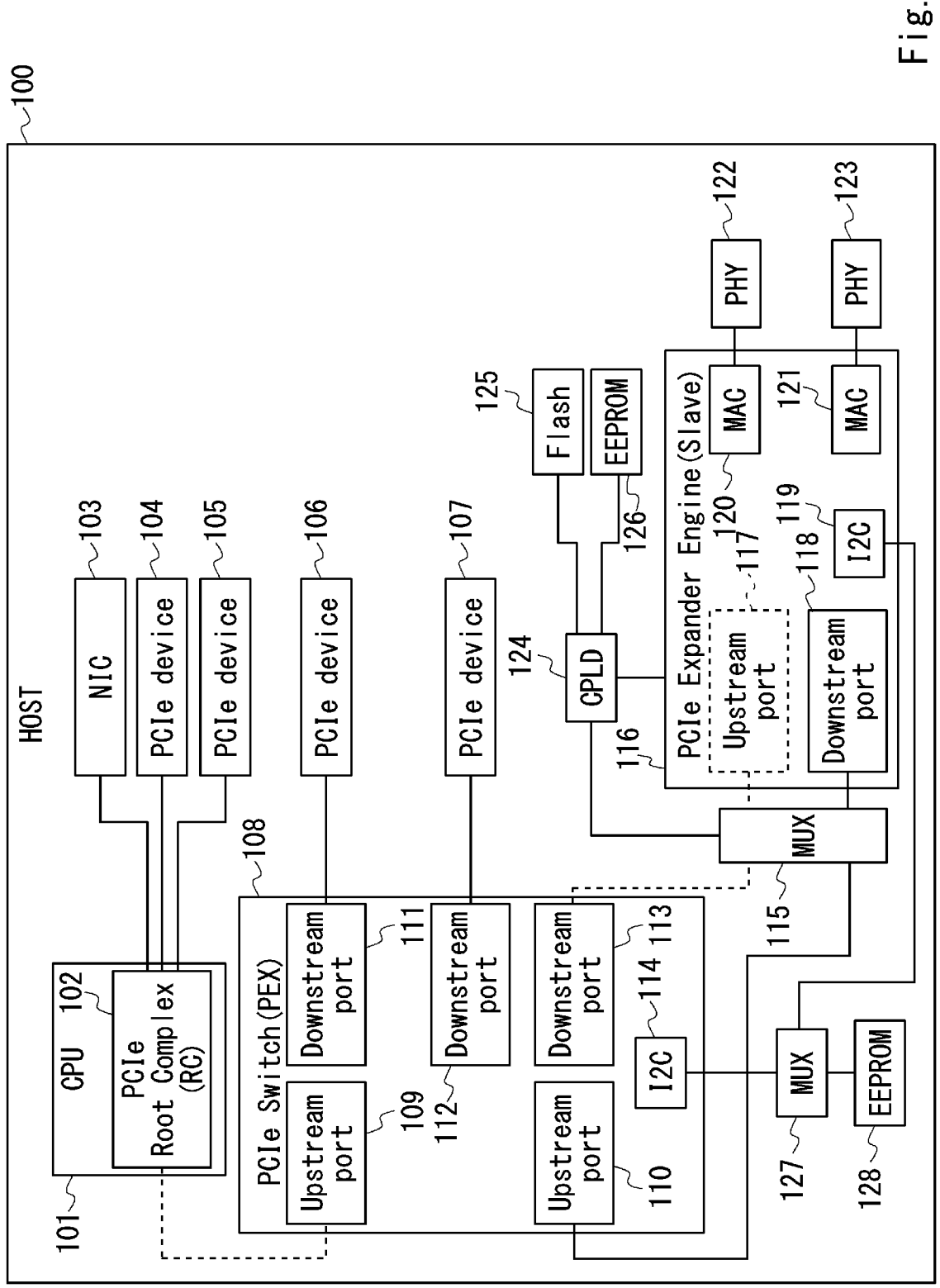
FIG. 3 is a block diagram showing an example of a host according to the first example embodiment of the present invention.

Next, a host 100 according to a first example embodiment of the present invention will be described. Each of FIGS. 2 and 3 is a block diagram showing an example of the host 100 according to the first example embodiment of the present invention. The host 100 according to the present invention is connected to, for example, another host 100 through a general-purpose network N (not shown). As shown in FIGS. 2 and 3, the host 100 includes a CPU 101 and a PCIe Root Complex 102. Note that although the PCIe Root Complex 102 is incorporated into and formed inside the CPU 101 in FIGS. 2 and 3, it may be formed outside the CPU 101. Further, as PCIe devices, a network interface card (hereafter also referred to as a "NIC") 103, PCIe Devices 104 and 105, a PCIe Switch 108, and the like are connected to the PCIe Root Complex 102.

The PCIe Switch 108 includes, as PCIe ports, upstream ports 109 and 110, and downstream ports 111, 112 and 113. Further, the PCIe Switch 108 includes an I2C (Inter-Integrated Circuit) controller 114. The upstream port 109 is connected to the PCIe Root Complex 102. The upstream port 110 is connected to a downstream port 118 of a PCIe Expander (PCIe Expander Engine) 116 through a multiplexer (also referred to as a "bus switching unit") 115. PCIe devices 106 and 107 are connected to the downstream ports 111 and 112, respectively. The downstream port 113 is connected to the upstream port 117 of the PCIe Expander 116 through the multiplexer 115. The I2C controller 114 is connected to an EEPROM 128 through a multiplexer 127. In the EEPROM 128, setting information such as PCIe port settings in the PCIe Switch 108 is stored.

The PCIe Expander 116 includes, as PCIe ports, the upstream port 117 and the downstream port 118, an I2C controller 119, MACs (Media Access Controls) 120 and 121. The I2C controller 119 is connected to the EEPROM 128 through the multiplexer 127. The MACs 120 and 121 are MAC-layer devices for performing communication through an Ethernet, and are connected to PHYs 122 and 123, respectively, which are physical-layer devices. The PCIe Expander 116 performs Ethernet communication with external apparatuses such as the other host 100 through PHYs 122 and 123 and through the general-purpose network N (not shown). Further, the PCIe Expander 116 is connected to a CPLD (Complex Programmable Logic Device) 124 by a bus through which parallel-path data and the like can be transmitted and received. A Flash 125 and an EEPROM 126 are connected to the CPLD 124. In the Flash 125, an FPGA image of the PCIe Expander 116 is stored. Specifically, the Flash 125 stores both master and slave FPGA images, and one of the FPGA images is loaded onto the PCIe Expander 116 according to the setting. Further, the PCIe Expander 116 performs master or slave operations according to the loaded FPGA image. In the EEPROM 126, setting information necessary for the PCIe Expander 116 to operate as a master or a slave, such as a choice of the master or slave and a MAC address, is stored. The PCIe Expander 116 receives data stored in the Flash 125 and the EEPROM 126 through the CPLD 124.

FIG. 2 shows the host 100 in which the PCIe Expander 116 is operating as a master. As shown in FIG. 2, when the PCIe Expander 116 operates as the master, the PCIe Switch 108 disables the upstream port 110. Further, the PCIe Expander 116 enables the upstream port 117 and disables the downstream port 118. Therefore, the PCIe link between the upstream port 110 of the PCIe Switch 108 and the downstream port 118 of the PCIe Expander 116 becomes a disconnected state. Meanwhile, the PCIe link between the downstream port 113 of the PCIe Switch 108 and the upstream port 117 of the PCIe Expander 116 becomes a connected state. As a result, the PCIe Expander 116 operating as the master can be connected to the PCIe devices under the PCIe Expander 116 operating as the slave, i.e., under the PCIe Expander 116 of the other host 100, which is the external device, through the general-purpose network N.

Next, FIG. 3 shows the host 100 in which the PCIe Expander 116 is operating as a slave. As shown in FIG. 3, when the PCIe Expander 116 operates as the slave, the PCIe Switch 108 disables the upstream port 109 and the downstream port 113 and enables the upstream port 110. Further, the PCIe Expander 116 disables the upstream port 117 and enables the downstream port 118. Therefore, the PCIe link between the PCIe Root Complex 102 and the upstream port 109 of the PCIe Switch 108, and the PCIe link between the downstream port 113 of the PCIe Switch 108 and the upstream port 117 of the PCIe Expander 116 become disconnected states. Meanwhile, the PCIe link between the upstream port 110 of the PCIe Switch 108 and the downstream port 118 of the PCIe Expander 116 becomes a connected state. As a result, the PCIe devices under the PCIe Switch 108 operating as the slave are disconnected from the PCIe Root Complex 102. Further, the PCIe Switch 108 and the PCIe devices 106 and 107 are connected under the PCIe Expander 116. As a result, the PCIe devices under the PCIe Expander 116 operating as the slave can be connected from the PCIe Expander 116 operating as the master, i.e., from the PCIe Expander 116 of the other host 100, which is the external device, through the general-purpose network N.

Figure 4:
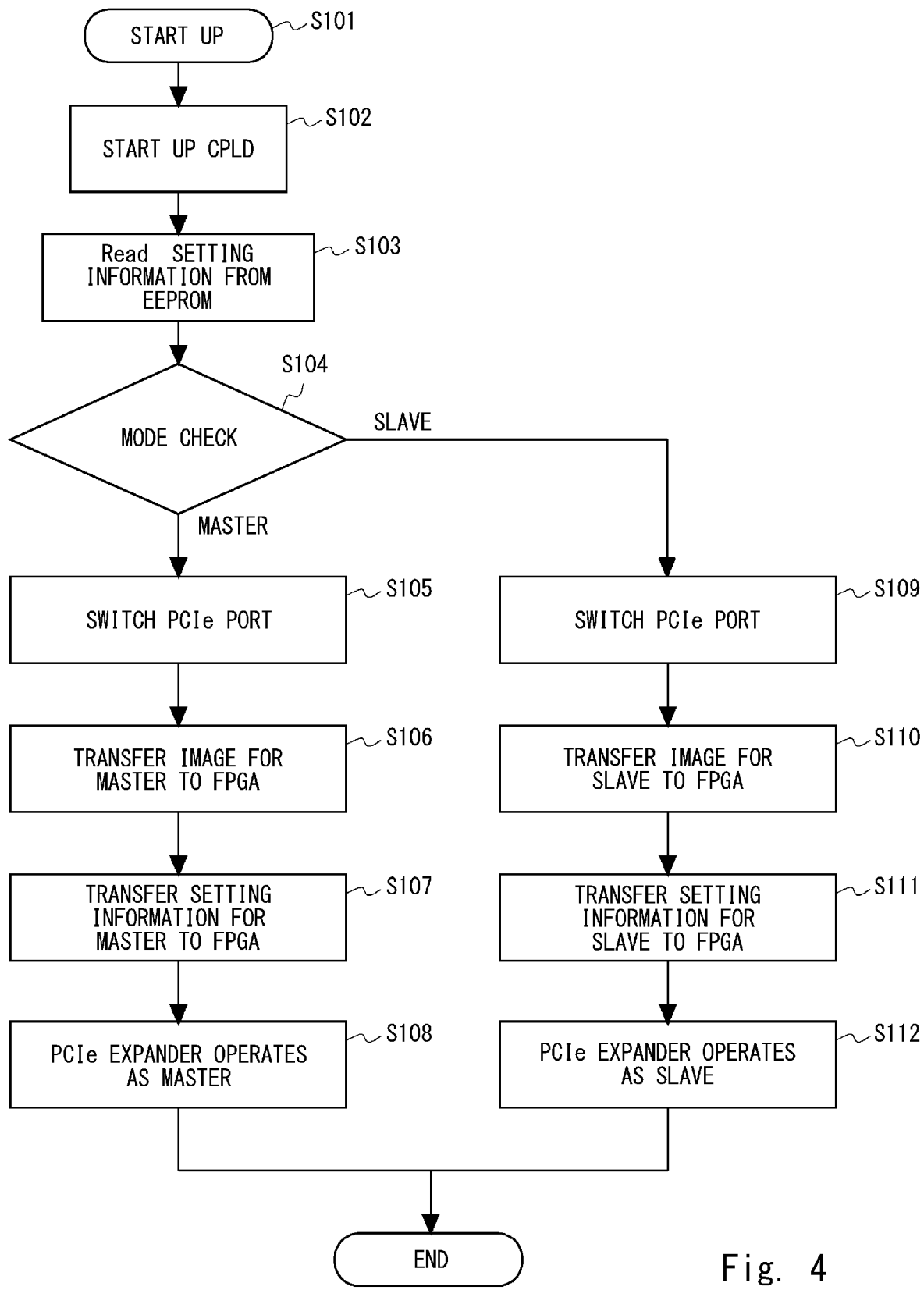
FIG. 4 is a flowchart for explaining an example of a connection control method according to the first example embodiment of the present invention.

Next, a connection control method according to the first example embodiment will be described with reference to FIG. 4.

Firstly, each device is started up when the host 100 is powered on (Step S101).

Next, the CPLD 124 loads data stored in its own non-volatile memory and starts up (Step S102).

Next, the CPLD 124 reads setting information stored in the EEPROM 126 (Step S103) and checks the operating mode of the PCIe Expander 116 (Step S104).

In the step S104, when the operating mode of the PCIe Expander 116 is a master (Step S104; Master), the CPLD 124 switches the connection of the PCIe port for the multiplexer 115 (Step S105). Specifically, when the PCIe Expander 116 operates as the master, the CPLD 124 connects the downstream port 113 of the PCIe Switch 108 to the upstream port 117 of the PCIe Expander 116. Further, the CPLD 124 maintains the upstream port 110 of the PCIe Switch 108 and the downstream port 118 of the PCIe Expander 116 in the disconnected state.

Next, the CPLD 124 reads an FPGA image for the master stored in the Flash 125 and transfers the FPGA image to the FPGA that forms the PCIe Expander 116 (Step S106).

Next, after the FPGA that forms the PCIe Expander 116 has completed the loading of the FPGA image, the CPLD 124 transfers setting information for the master stored in the EEPROM 126 to the FPGA (Step S107).

Next, the PCIe Expander 116 operates as the master after making the setting based on the setting information (Step S108). At the same time, the I2C controller 114 of the PCIe Switch 108 reads setting information for the PCIe switch stored in the EEPROM 128, and thereby sets the PCIe ports. Specifically, when the PCIe Expander 116 operates as the master, the I2C controller 114 enables the upstream port 109, and the downstream ports 111, 112 and 113, and disables the upstream port 110. As a result, the connected state shown in FIG. 2 is obtained, so that the PCIe Expander 116 can operate as the master.

On the other hand, in the step S104, when the operating mode of the PCIe Expander 116 is a slave (Step S104; Slave), the CPLD 124 switches the connection of the PCIe port for the multiplexer 115 (Step S109). Specifically, when the PCIe Expander 116 operates as the slave, the CPLD 124 connects the upstream port 110 of the PCIe Switch 108 to the downstream port 118 of the PCIe Expander 116. Further, the CPLD 124 maintains the downstream port 113 of the PCIe Switch 108 and the upstream port 117 of the PCIe Expander 116 in the disconnected state.

Next, the CPLD 124 reads an FPGA image for the slave stored in the Flash 125 and transfers the FPGA image to the FPGA that forms the PCIe Expander 116 (Step S110).

Next, after the FPGA that forms the PCIe Expander 116 has completed the loading of the FPGA image, the CPLD 124 transfers setting information for the slave stored in the EEPROM 126 to the FPGA (Step S111).

Next, the PCIe Expander 116 operates as the slave after making the setting based on the setting information (Step S112). At the same time, the I2C controller 114 of the PCIe Switch 108 reads setting information for the PCIe switch stored in the EEPROM 128, and thereby sets the PCIe ports. Specifically, when the PCIe Expander 116 operates as the slave, the I2C controller 114 disables the upstream port 109 and the downstream port 113, and enables the upstream port 110, and the downstream ports 111 and 112. As a result, the connected state shown in FIG. 3 is obtained, so that the PCIe Expander 116 can operate as the slave.

Figure 5:
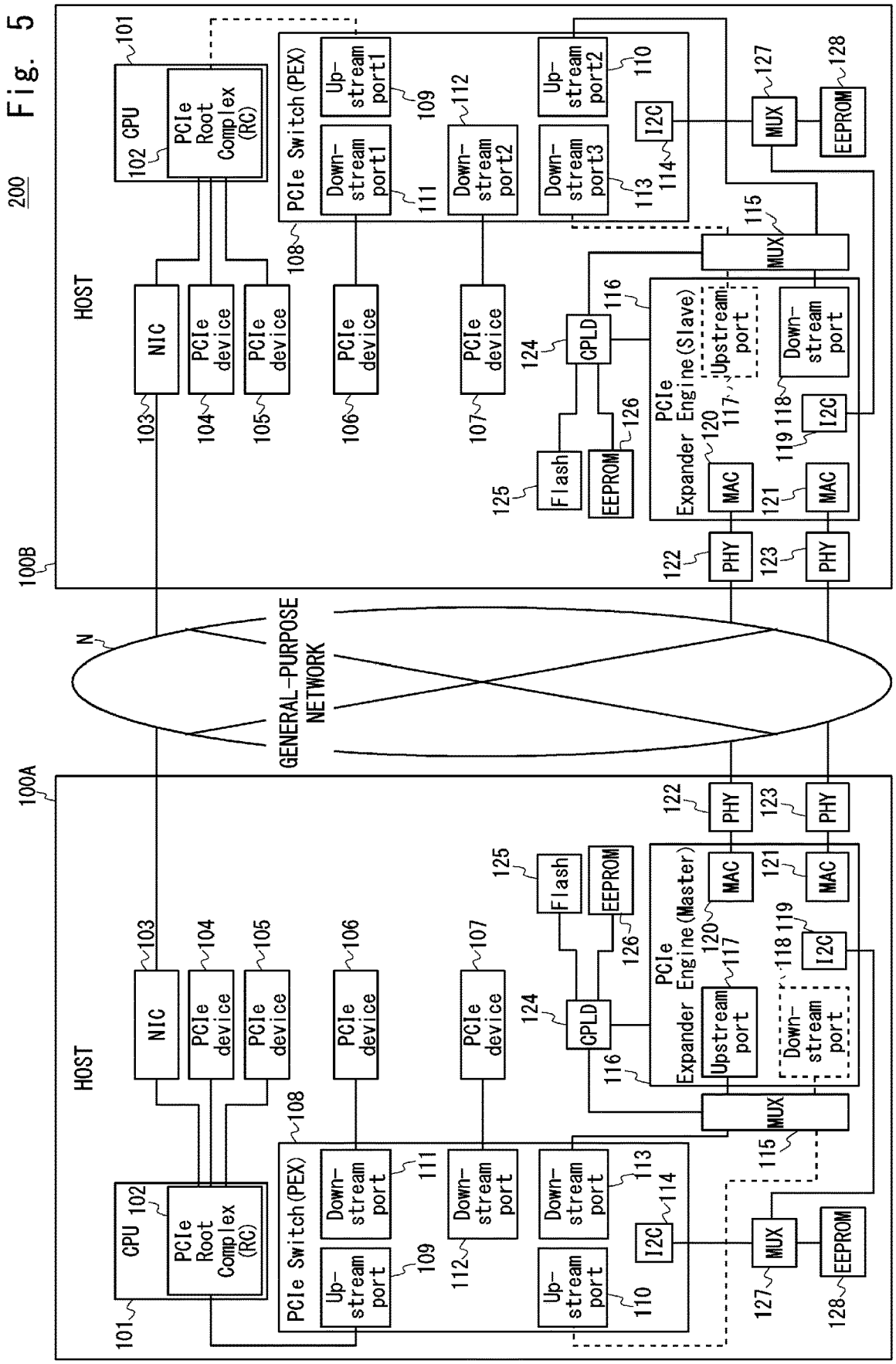
FIG. 5 is a block diagram for explaining an example of an information processing system according to the first example embodiment of the present invention.

FIG. 5 shows an information processing system 200 according to the first example embodiment. The information processing system 200 includes two hosts 100A and 100B according to the first example embodiment. Each of the hosts 100A and 100B has a configuration identical to that of the above-described host 100. Further, the hosts 100A and 100B are connected to each other through a general-purpose network N. Specifically, PHYs 122 and 123 of each of the hosts 100A and 100B are connected to the general-purpose network N, so that the PCIe Expanders 116 of the hosts 100A and 100B are connected to each other through the general-purpose network N. Further, in the example shown in FIG. 5, the host 100A operates as a master and the host 100B operates as a slave. Specifically, the PCIe Expander 116 of the host 100A operates as a master and the PCIe Expander 116 of the host 100B operates as a slave.

Figure 6:
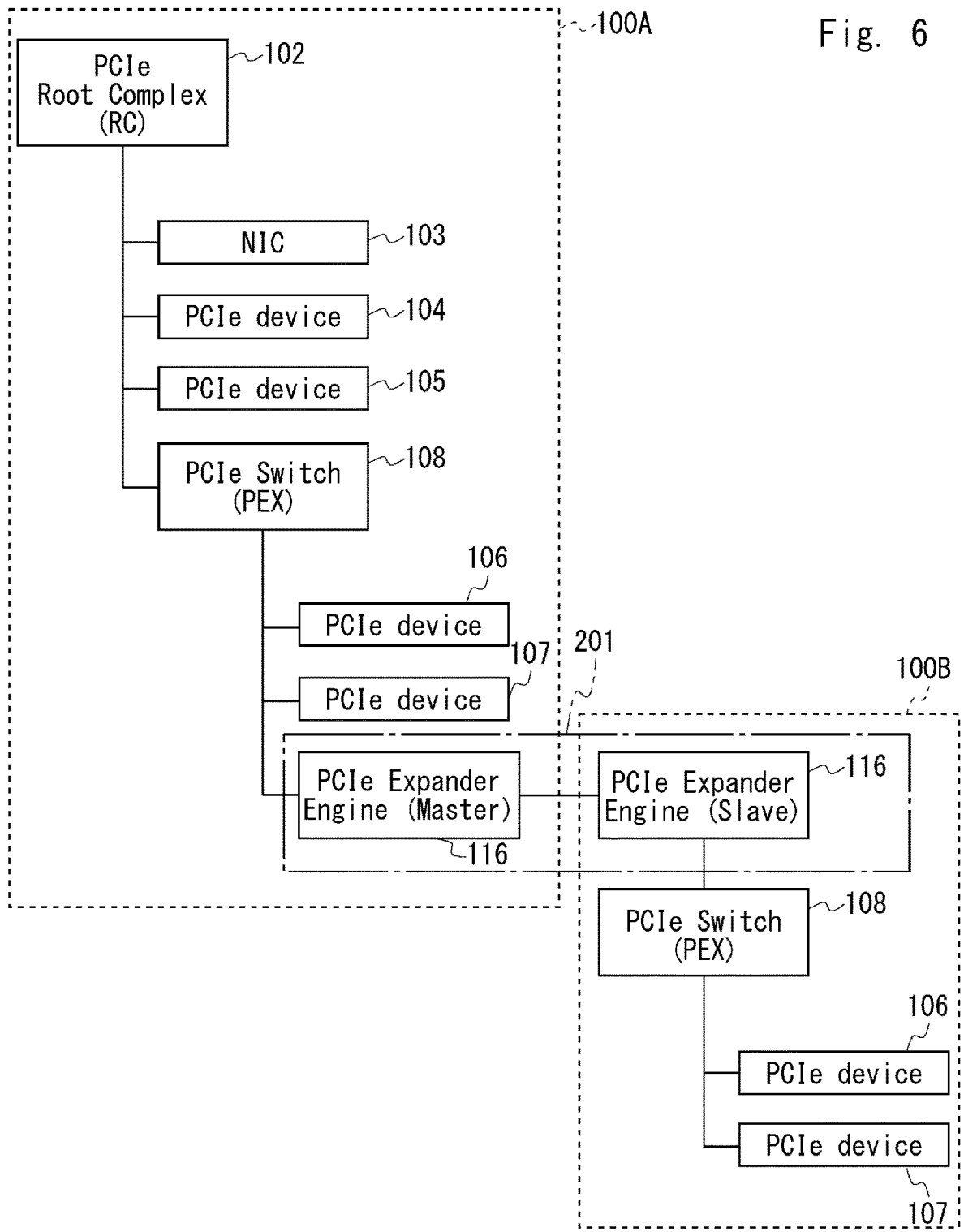
FIG. 6 is a block diagram for explaining a PCI bus tree as viewed from a master-side host in the information processing system according to the first example embodiment of the present invention.

FIG. 6 shows a PCI bus tree as viewed from the PCIe Root Complex 102 of the host 100A. A NIC 103, PCIe devices 104 and 105, a PCIe Switch 108, and PCIe devices 106 and 107, all of which are PCIe devices disposed inside the host 100A, are connected under the aforementioned PCIe Root Complex 102. Further, through the general-purpose network N, the PCIe Expander 116 of the host 100A is connected as the master and the PCIe Expander 116 of the host 100B is connected as the slave. Further, the PCIe Expander 116 of the host 100A operating as the master and the PCIe Expander 116 of the host 1001B operating as the slave logically operate as one PCIe switch 201. Further, as shown in FIG. 3, the PCIe Switch 108 inside the host 100B operating as the slave is disconnected from the PCIe Root Complex 102. In this way, the PCIe Switch 108 inside the host 100B is connected under the downstream port 118 of the PCIe Expander 116. That is, in the host 100B, the PCIe Switch 108 and the PCIe devices 106 and 107 are connected under the PCIe Expander 116. Therefore, as shown in FIG. 6, the PCIe Switch 108 and the PCIe devices 106 and 107 of the host 100B are connected under the multiplexer 115 as a part of the PCI bus tree connected to the PCIe Root Complex 102 of the host 100A.

Figure 7:
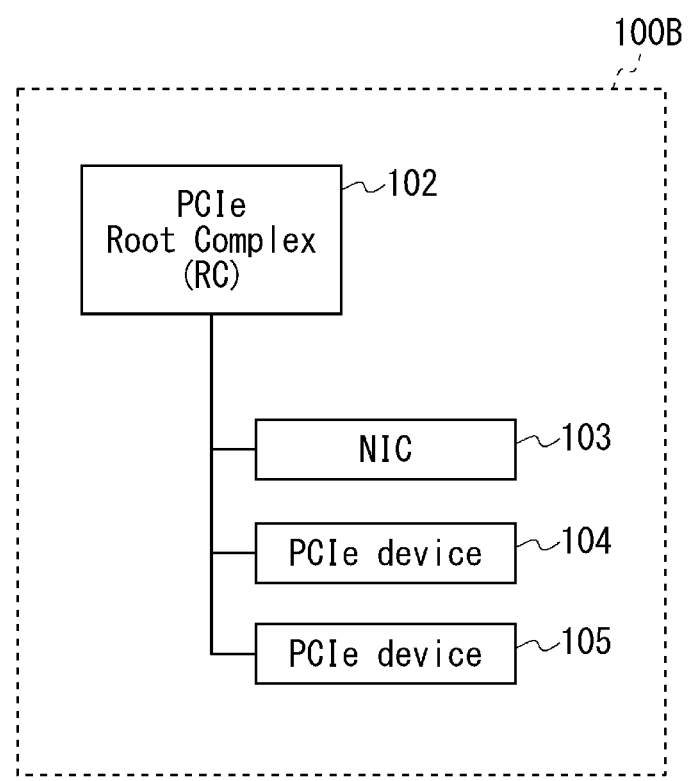
FIG. 7 is a block diagram for explaining the PCI bus tree as viewed from a slave-side host in the information processing system according to the first example embodiment of the present invention.

Next, FIG. 7 shows a PCI bus tree as viewed from the PCIe Root Complex 102 of the host 100B. As described above, the PCIe Switch 108 disposed inside the host 100B is disconnected from the PCIe Root Complex 102. As a result, only the NIC 103 and the PCIe devices 104 and 105 are connected under the PCIe Root Complex 102 disposed inside the host 100B.

As described above, the host 100A operating as the master can use a PCIe device(s) disposed inside the host 100B which is operating as the slave and is connected to the host A through the general-purpose network N. Further, the host 100B operating as the slave can operate in parallel (i.e., simultaneously) with the host 100A by using a remaining PCIe device(s).

Figure 8:
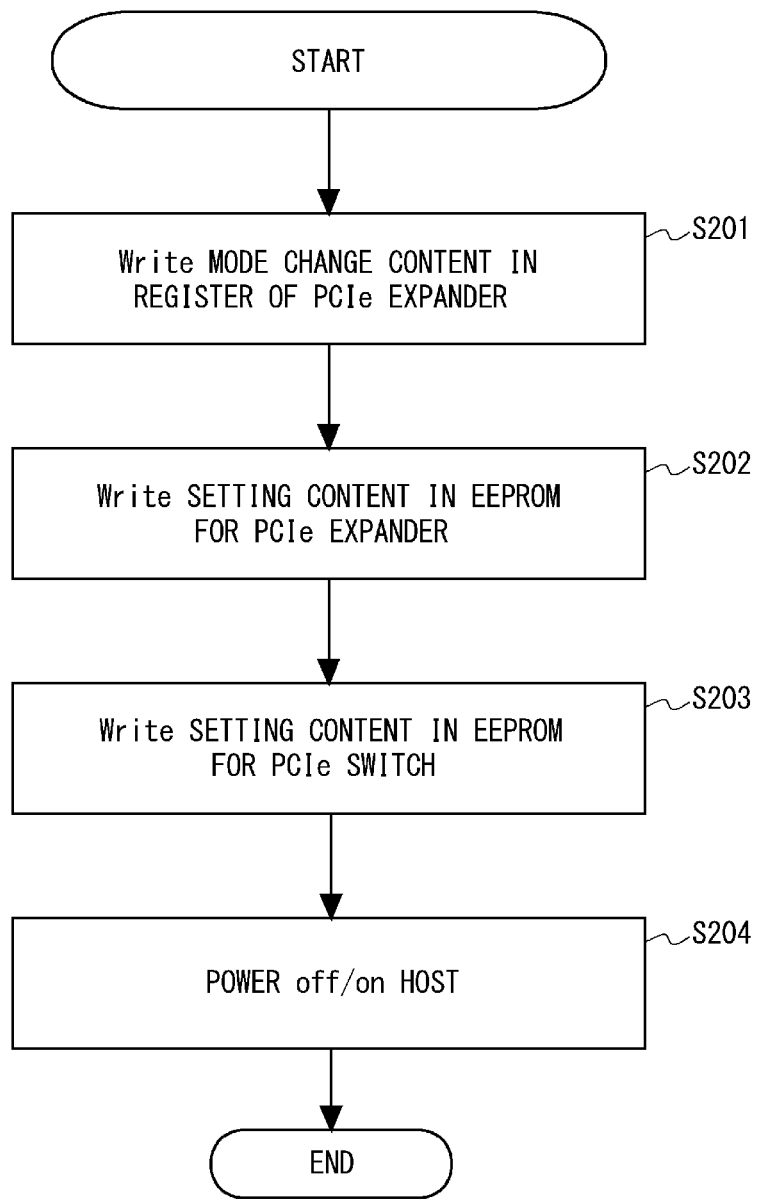
FIG. 8 is a flowchart for explaining an example of a method for switching an operating mode of the host according to the first example embodiment of the present invention.

Next, a method for switching the operating mode of the host 100 according to the first example embodiment will be described with reference to FIG. 8. The switching of the operating mode of the host 100 is performed while the host 100 is operating.

Firstly, a mode change content (e.g., a new mode to which the operating mode should be switched) is written into a register of the PCIe Expander 116 (Step S201). There are two cases in which of which access to the register of the PCIe Expander 116 occurs. A first case of the access is, for example, access that is made when the PCIe Expander is operating as a master immediately before its operating mode is changed. In this case, the PCIe Expander 116 is connected as a PCIe device under the PCIe Root Complex 102 of the host 100. Then, the CPU 101 accesses the register of the PCIe Expander 116 and thereby writes the mode change content (e.g., the new mode) thereinto. A second case of the access is, for example, access that is made when the PCIe Expander is operating as a slave immediately before its operating mode is changed. In this case, the register of the PCIe Expander 116 is accessed from another host 100 operating as a master through the general-purpose network N. Specifically, the other host 100 accesses the register of the PCIe Expander 116 through the MAC 120 or 121 of the PCIe Expander 116. Then, the CPU 101 of the other host 100 accesses the register of the PCIe Expander 116 and thereby writes the mode change content (e.g., the new mode) thereinto.

The mode change content is written into the register of the PCIe Expander 116 in either of the above-described methods.

Next, the PCIe Expander 116, of which the mode change content has been written into the register, accesses the EEPROM 126, in which the setting information of the PCIe Expander 116 is stored, through the CPLD 124, and thereby writes the setting content of the operating mode to be changed (i.e., the new operating mode) thereinto (Step S202).

Next, the PCIe Expander 116 accesses the EEPROM 128, in which the setting information of the PCIe Switch 108 is stored, and thereby writes the setting content corresponding to the operating mode to be changed (i.e., the new operating mode) thereinto (Step S203). Specifically, the PCIe Expander 116 accesses the EEPROM 128 from the I2C controller 119 through the multiplexer 127. Then, the PCIe Expander 116 changes the setting information of the PCIe Switch 108 according to the operating mode to be changed (i.e., the new operating mode). For example, when the operating mode is changed to the master, the PCIe Expander 116 writes, into the EEPROM 128, setting information for enabling the upstream port 109 and the downstream ports 111, 112 and 113, and disabling the upstream port 110. Further, when the operating mode is changed to the slave, the PCIe Expander 116 writes, into the EEPROM 128, setting information for disabling the upstream port 109 and the downstream port 113, and enabling the upstream port 110 and the downstream ports 111 and 112.

Next, the host 100 is temporarily powered off and then powered on (Step S204). By temporarily powering off the host 100 and then powering on it, the FPGA image is loaded onto the PCIe Expander 116 according to the changed operating mode (i.e., the new operation mode). Next, the PCIe Expander 116 enables or disables the PCIe ports of the PCIe Switch 108 according to the setting, and operates in the master or slave mode.

Note that, in the step S204, the host 100 may be instructed to power off and power on by an external management terminal (not shown) connected to the host 100 through the general-purpose network N. Further, the management terminal or the like may be provided in the information processing system 200.

For example, when the mode of the host 100A, which has operated as the master until then, is switched, an external management terminal or the like instructs the host 100A, which has been the master, to power off and power on. The host 100B connected to the master as the slave may be kept in the slave operating state when its mode switching is unnecessary. For example, the host 100B connected to the master as the slave may be connected, as a slave, to another host 100A operating as the master on the general-purpose network N by an external management terminal or the like.

When the mode of the host 100B, which has operated as the slave until then, is switched, it is necessary to power off and power on this slave and also to power off and power on the host 100A which is the master and to which the slave has been connected. For example, in the PCI bus tree shown in FIG. 6, when the mode of the host 100B on the slave side is switched, there is no longer any slave-side device in the PCI bus tree. Therefore, when the mode of the host 100B, which has operated as the slave, is switched, it is necessary to power on and power off the host 100A, which has been connected as the master, and thereby to reconstruct the PCI bus tree.

Figure 9:
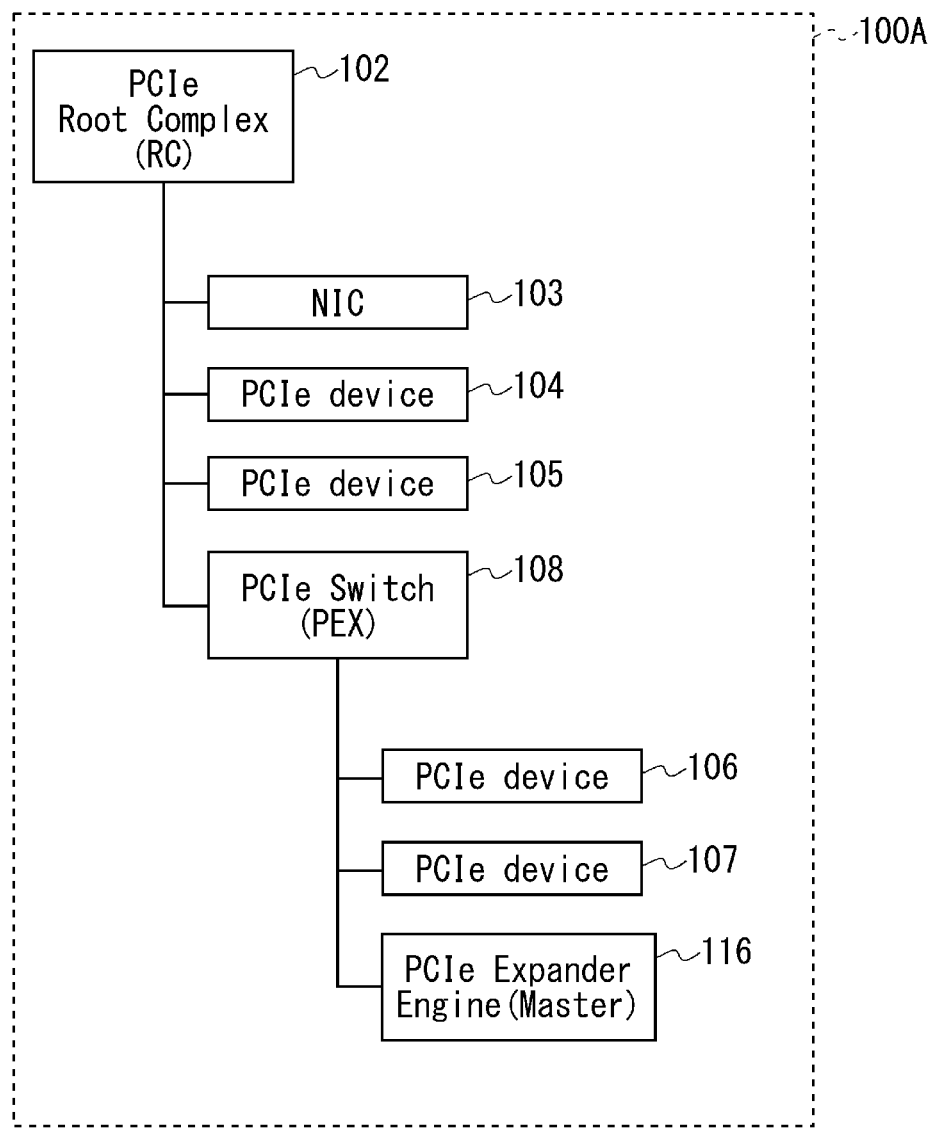
FIG. 9 is a block diagram for explaining a PCI bus tree inside the master-side host in the information processing system according to the first example embodiment of the present invention.

Note that in order to manage what kind of PCIe devices are connected to a large number of hosts 100 connected to the general-purpose network N, each of the hosts 100 independently starts up in a master operating mode, and the CPU 101 recognizes the PCI bus tree inside the host 100. Note that the term "independently" means "a state in which none of the other hosts 100 connected to the general-purpose network N is a slave thereof". Further, in each of the hosts 100, the timing at which the host 100 recognizes the PCI bus tree is, basically, when the host 100 is started up. FIG. 9 shows a PCI bus tree when the host 100 shown in FIG. 2 is independently started up in the master operating mode. Based on information about the PCI bus tree shown in FIG. 9, it is possible to recognize PCIe devices provided in the host 100 itself. By sending the information about the PCI bus tree shown in FIG. 9 from the NIC 103 to an external management terminal or the like (not shown) through the general-purpose network N, it is possible to manage the PCIe devices of all the hosts 100 connected to the general-purpose network N. Further, the management terminal or the like may be provided in the information processing system 200. In this way, it is possible to flexibly assign PCIe devices connected under the PCIe switches 108 of all the hosts 100 to the host 100A that is operating as the master according to the operating statuses and/or the load statuses of the hosts 100.

Figure 10:
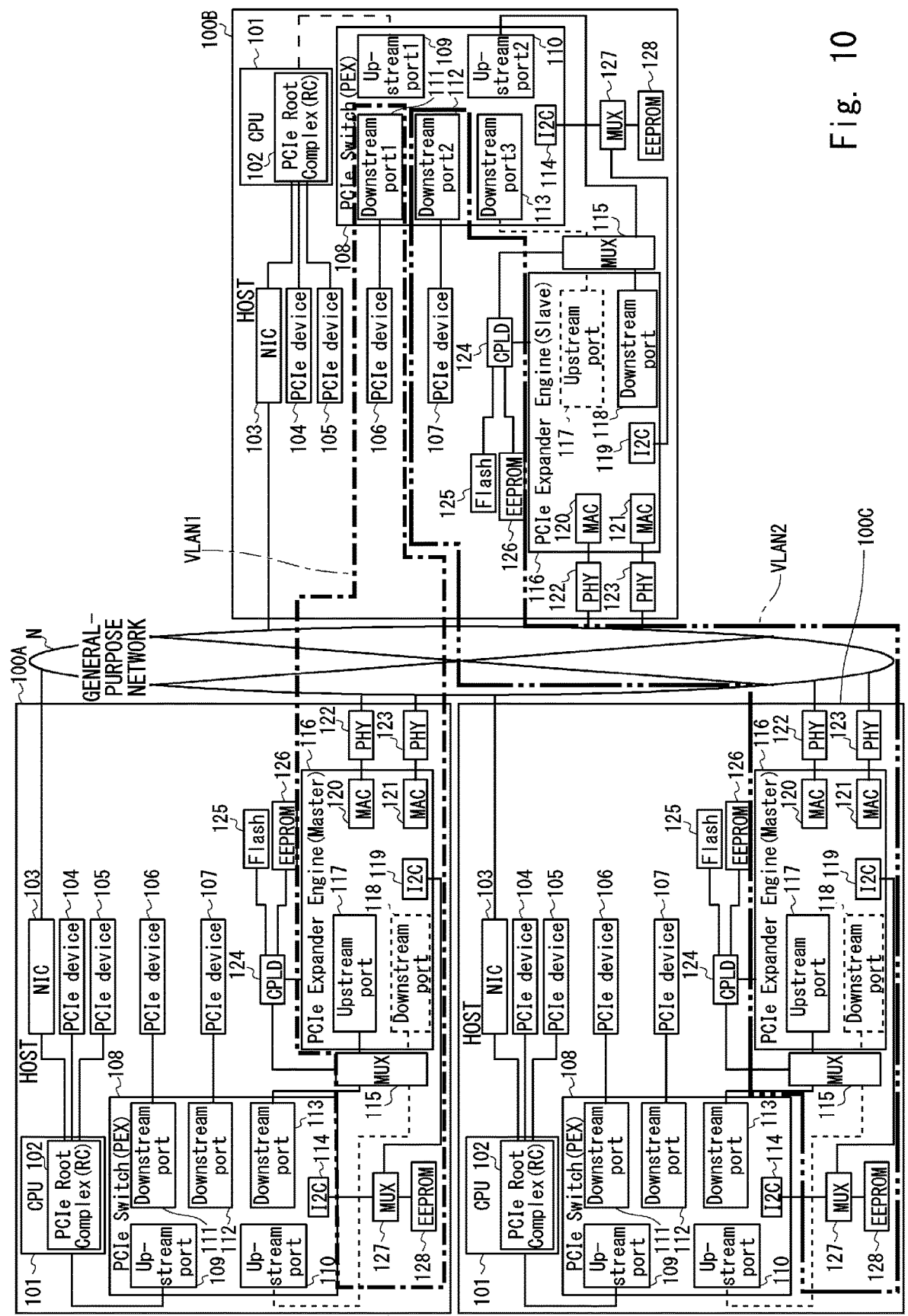
FIG. 10 is a block diagram for explaining another example of the information processing system according to the first example embodiment of the present invention.
Figure 11:
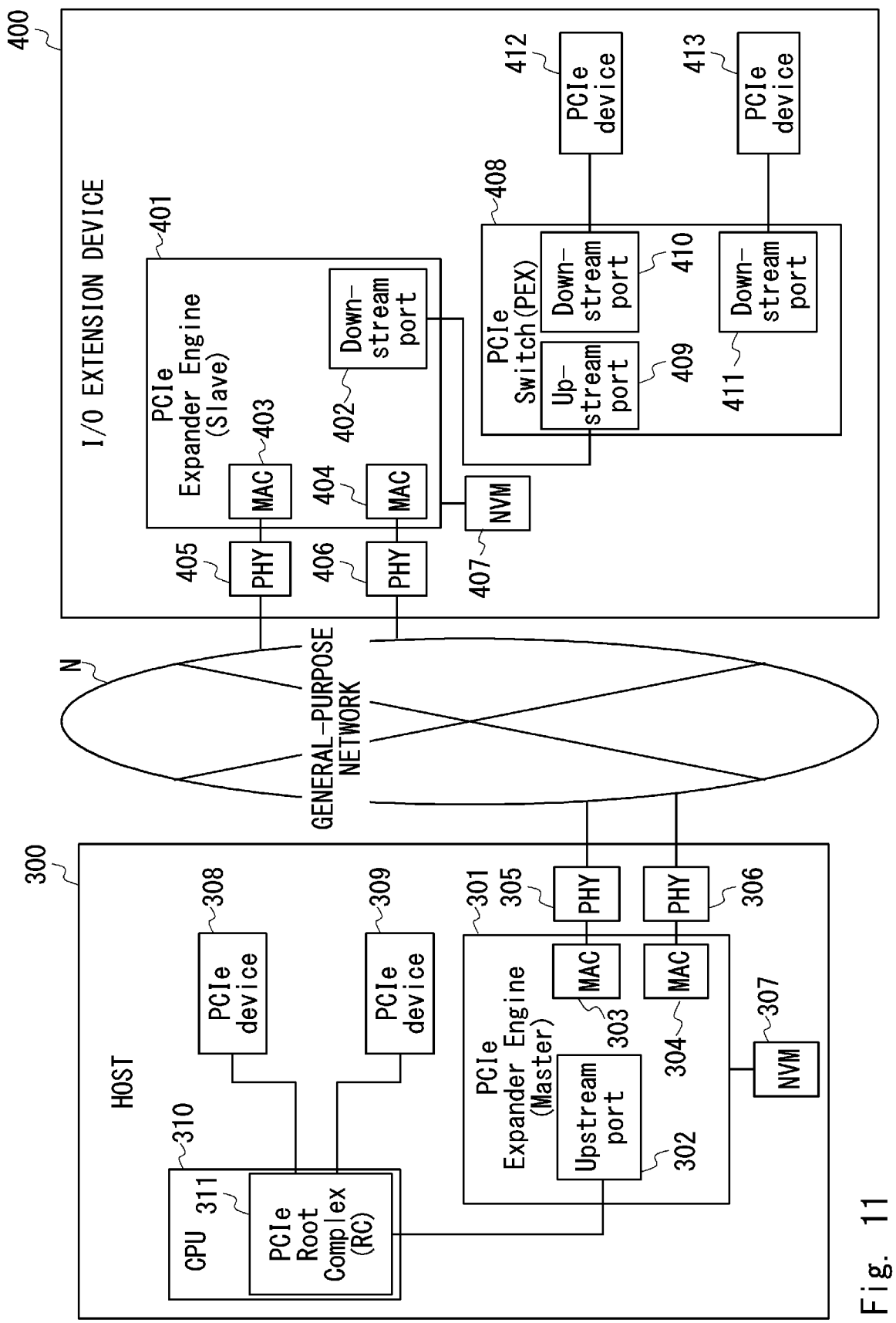
FIG. 11 is a block diagram for explaining an example of a technology for connecting an interconnect using PCIe to the outside of the housing of a computer.
Figure 12:
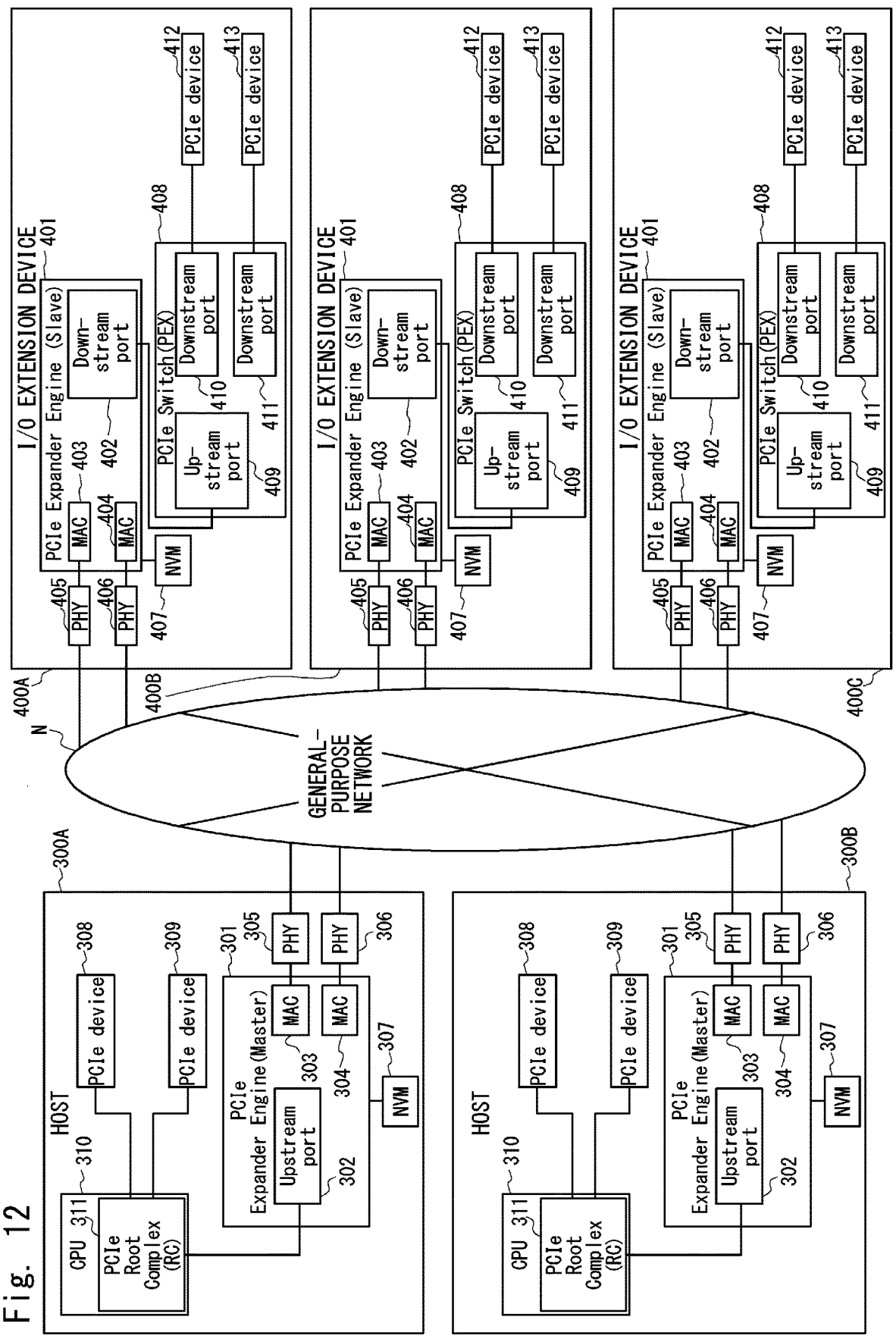
FIG. 12 is a block diagram for explaining an example of a technology for connecting an interconnect using PCIe to the outside of the housing of a computer.

FIG. 10 shows an example in which PCIe devices are shared among a plurality of hosts 100A, 100B and 100C. The hosts 100A and 100C, which operate as masters, are connected to the host 100B, which operates as a slave, through the general-purpose network N. Note that the PCIe devices on the slave side are assigned by using a VLAN (Virtual LAN) of an Ethernet. Specifically, the host 100A is assigned to a VLAN 1 and the host 100C is assigned to a VLAN 2. Further, the PCIe Expander 116 of the host 100B is connected to the VLANs 1 and 2, which serve as masters. Further, the PCIe Expander 116 of the host 100B assigns PCIe devices under this PCIe Expander 116 to the VLANs 1 and 2. For example, in the example shown in FIG. 10, the PCIe device 106 of the host 100B is assigned to the VLAN 1 and the PCIe device 107 thereof is assigned to the VLAN 2. As a result, the PCIe device 106 of the host 100B is connected under the PCI bus tree of the PCIe Root Complex 102 of the host 100A. Further, the PCIe device 107 of the host 100B is connected under the PCI bus tree of the PCIe Root Complex 102 of the host 100C. As described above, the plurality of hosts 100A and 100C operating as the masters can use PCIe devices disposed inside the host 100B operating as the slave.

According to the host 100, the information processing system, the connection control method, and the connection control program in accordance with the above-described first example embodiment of the present invention, the PCIe Expander 116 can operate in either a master mode or a slave mode. Therefore, it is possible to switch the operating mode of each of a large number of hosts 100 connected to the general-purpose network N to a master operating mode or a slave operating mode. Further, the host 100 operating as the master can freely connect and use any of the plurality of PCIe devices 106 and 107 disposed inside the host 100 operating as the slave.

Further, even when the host 100A operating as the other master uses the PCIe devices 106 and 107 in the host 100B operating the slave, the host 100B operating as the slave can operate as an independent host 100 by using the CPU disposed in the host 100B and/or the locally-connected PCIe devices 104 and 105.

Further, the host 100A operating as the master does not require any dedicated I/O extension device, which would otherwise be required for each of the hosts 100A, in order to be connected to the external PCIe devices 106 and 107. However, along with the host 100B operating as the slave, the I/O extension device may be connected to the host 100A operating as the master.

Further, each of a number of hosts 100 connected to the general-purpose network N is independently started up in the master operating mode, and its CPU 101 recognizes the PCI bus tree inside the host 100. Then, each of the hosts 100 sends information about the PCI bus tree from the NIC 103 to an external management terminal or the like through the general-purpose network N. In this way, the management terminal can acquire information about PCIe devices implemented in the respective hosts 100A and 100B (i.e., information about the PCI bus trees in the respective hosts 100A and 100B) in advance without establishing the connection between the host 100A operating as the master and the host 100B operating as the slave. In this way, the management terminal can manage the PCIe devices implemented in the respective hosts 100A and 100B.

Although the present invention is described as a hardware configuration in the above-described example embodiments, the present invention is not limited to the hardware configurations. In the present invention, the processing procedures shown in the flowcharts shown in FIGS. 4 and 8 can also be implemented by having a CPU (Central Processing Unit) execute a computer program(s).

Further, the above-described program can be stored by using a ROM and supplied to a computer. Further, the above-described program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory)). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line such as an electric wire and an optical fiber or a wireless communication line.

Although the present invention has been described above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent application No. 2020-163071, filed on Sep. 29, 2020, the disclosure of which is incorporated herein in its entirety by reference.

INDUSTRIAL AVAILABILITY

It is possible to provide an information processing apparatus, an information processing system, a connection control method, and a non-transitory computer readable medium storing a connection control program capable of sharing, among a plurality of information processing apparatuses, PCIe devices disposed inside the respective information processing apparatuses.

REFERENCE SIGNS LIST 100, 100A, 100B, 100C HOSTS (INFORMATION PROCESSING APPARATUS)
101 CPU
102 PCIe ROOT COMPLEX
103 NIC
104, 105, 106, 107 PCIe DEVICE
108 PCIe SWITCH
109, 110, 117 UPSTREAM PORT
111, 112, 113, 118 DOWNSTREAM PORT
114, 119 I2C CONTROLLER
115, 127 MULTIPLEXER
116 PCIe EXPANDER
120, 121 MAC
122, 123 PHY
124 CPLD
125 Flash
126, 128 EEPROM
200 INFORMATION PROCESSING SYSTEM
201 PCIe SWITCH
N GENERAL-PURPOSE NETWORK

What is claimed is:

1. An information processing apparatus capable of being connected to another information processing apparatus through a general-purpose network, the information processing apparatus comprising:
    a plurality of peripheral component interconnect express (PCIe) devices;
    a PCIe root complex configured to serve as a root of a PCI bus tree formed by a bus to which the plurality of PCIe devices are connected;
    a PCIe expander configured to connect the information processing apparatus to the general-purpose network; and
    a PCIe switch configured to switch a connection between the PCIe root complex and the PCIe expander, wherein
    at least one of the plurality of PCIe devices is connected to the PCIe root complex through the PCIe switch,
    the PCIe switch includes a first upstream port capable of being connected to the PCIe root complex, a second upstream port capable of being connected to a downstream port of the PCIe expander, and a downstream port capable of being connected to an upstream port of the PCIe expander,
    the PCIe expander enables the first upstream port and the downstream port and disables the second upstream port when the information processing apparatus functions as a master and the other information processing apparatus functions as a slave, and
    the PCIe expander disables the first upstream port and the downstream port and enables the second upstream port when the information processing apparatus functions as the slave and the other information processing apparatus functions as the master.

2. The information processing apparatus according to claim 1, wherein at least one of remaining PCIe devices among the plurality of PCIe devices is connected under the PCIe root complex without the PCIe switch interposed therebetween.

3. The information processing apparatus according to claim 1, configured to start up independently in a master operating mode and thereby to acquire information about the PCI bus tree in the information processing apparatus.

4. An information processing system comprising a plurality of information processing apparatuses connected to each other through a general-purpose network, wherein
    at least one of the information processing apparatuses among the plurality of information processing apparatuses comprises:
    a plurality of peripheral component interconnect express (PCIe) devices;
    a PCIe root complex configured to serve as a root of a PCI bus tree formed by a bus to which the plurality of PCIe devices are connected;
    a PCIe expander configured to connect the at least one of the information processing apparatuses to the general-purpose network; and
    a PCIe switch configured to switch a connection between the PCIe root complex and the PCIe expander,
    at least one of the plurality of PCIe devices is connected to the PCIe root complex through the PCIe switch,
    the PCIe switch includes a first upstream port capable of being connected to the PCIe root complex, a second upstream port capable of being connected to a downstream port of the PCIe expander, and a downstream port capable of being connected to an upstream port of the PCIe expander,
    the PCIe expander enables the first upstream port and the downstream port and disables the second upstream port when the at least one of the information processing apparatuses functions as a master and another information processing apparatus functions as a slave, and
    the PCIe expander disables the first upstream port and the downstream port and enables the second upstream port when the at least one of the information processing apparatuses functions as a slave and the other information processing apparatus functions as a master.

5. The information processing system according to claim 4, wherein at least one of remaining PCIe devices among the plurality of PCIe devices is connected under the PCIe root complex without the PCIe switch interposed therebetween.

6. The information processing system according to claim 4, wherein the information processing apparatus is configured to start up independently in a master operating mode and thereby to acquire information about the PCI bus tree in the information processing apparatus.

7. A connection control method performed in an information processing apparatus capable of being connected to another information processing apparatus through a general-purpose network, wherein
    the information processing apparatus includes:
    a plurality of peripheral component interconnect express (PCIe) devices;
    a PCIe root complex configured to serve as a root of a PCI bus tree formed by a bus to which the plurality of PCIe devices are connected;
    a PCIe expander configured to connect the information processing apparatus to the general-purpose network; and
    a PCIe switch configured to switch a connection between the PCIe root complex and the PCIe expander,
    at least one of the plurality of PCIe devices is connected to the PCIe root complex through the PCIe switch,
    the PCIe switch includes a first upstream port capable of being connected to the PCIe root complex, a second upstream port capable of being connected to a downstream port of the PCIe expander, and a downstream port capable of being connected to an upstream port of the PCIe expander, the PCIe expander enables the first upstream port and the downstream port and disables the second upstream port when the information processing apparatus functions as a master and the other information processing apparatus functions as a slave, and the PCIe expander disables the first upstream port and the downstream port and enables the second upstream port when the information processing apparatus functions as a slave and the other information processing apparatus functions as a master.

8. The connection control method according to claim 7, wherein the information processing apparatus starts up independently in a master operating mode and thereby acquires information about the PCI bus tree in the information processing apparatus.

\* \* \* \* \*